July 28, 1964 R. L. LEVESQUE ETAL 3,142,155
GAS TURBINE ENGINE COOLING ARRANGEMENT
Filed Nov. 29, 1961
Fig 1
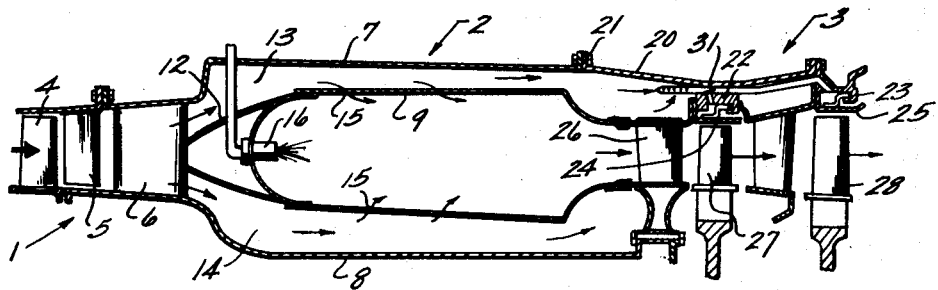
Fig 2
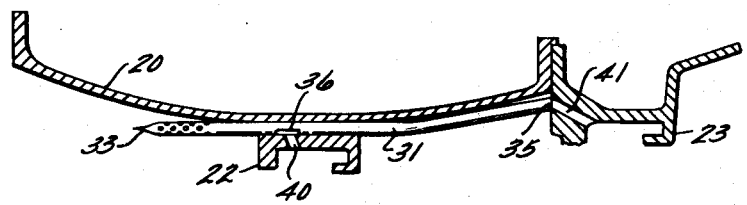
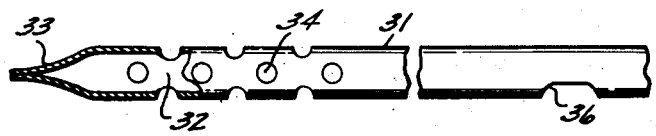
Fig 3
INVENTORS
ROGER M. BABCOCK
ROBERT L. LEVESQUE
BY
George R. Powers
AGENT

United States Patent Office 3,142,155
Patented July 28, 1964

3,142,155
GAS TURBINE ENGINE COOLING ARRANGEMENT
Robert Lucien Levesque, Winthrop, and Roger Milton Babcock, Wakefield, Mass., assignors to General Electric Company, a corporation of New York
Filed Nov. 29, 1961, Ser. No. 155,743
3 Claims. (Cl. 60—39.66)

Our invention relates to cooling means for gas turbine engines and, more particularly, to improved cooling means for cooling high temperature portions of the turbine with compressor discharge air.

In consideration of engine size, weight, efficiency, and other factors, it is generally desirable to supply the products of combustion to the turbine of a gas turbine engine at the highest possible temperature. In practice, however, it has been found that the metals used in the construction of the turbine are deleteriously affected by excessively high gas temperatures. The expansion and contraction resulting from repeatedly heating the turbine casing to excessively high temperatures may ultimately cause cracking or other failures of the engine casing. Excessively hot combustion gases may also cause deleterious erosion of the exposed surfaces of the turbine casing. In addition, excessively high turbine inlet temperatures may make it extremely difficult or even impossible to maintain the small clearances between the turbine casing and the rotating portions of the turbine necessary for efficient engine operation. In the absence of cooling provisions, therefore, the maximum permissible turbine inlet temperature is limited as a practical matter by the characteristics of the metals used in the construction of the turbine.

Cooling means may be provided for maintaining the turbine casing and other parts below the maximum allowable temperatures determined by the characteristics of the metals used in the turbine construction, thereby allowing the combustion products to be heated to higher temperatures than would otherwise be possible. This cooling may be provided by ducting compressed air from the vicinity of the downstream end of the combustion liner, a convenient location for the extraction of the air because of the proximity to the turbine, and directing the relatively low temperature compressor discharge air to the hot portions of the turbine. Because of carbon and foreign matter suspended in the compressed air in the vicinity of the downstream end of the combustion liner, however, the aid duct may be obstructed by ingested deposits, and fail to accomplish the cooling necessary to prevent damage to the turbine. Since the combustion products are intentionally heated to a higher temperature than the metals can safely withstand when cooling means are not used, obstruction of the duct by deposits of carbon or other matter will result in overheating of the turbine with the attendant deleterious effects. Additionally, carbon deposits may burn within the duct and cause metal erosion and pitting.

It is, therefore, the principal object of this invention to provide improved cooling means for receiving compressor discharge air in the vicinity of the downstream end of the combustion liner, while rejecting carbon or other foreign particles which may obstruct the cooling means, and directing the compressed air to the hot portions of the turbine for cooling purposes.

Briefly stated, in accordance with one embodiment, the cooling means of this invention is comprised of internal cooling tubes extending axially into the space between the combustion liner and the engine casing at the downstream end of the liner. Each cooling tube has an internal axial cooling passage extending rearwardly to communicate with the hot portions of the turbine casing. The forward end of the passage is blocked, and a plurality of inlet openings communicating with the passage are provided in the tube wall, the inlet openings being disposed perpendicularly to the direction of flow of the compressed air in the space between the liner and the casing. Thus, compressed air may flow through the inlet openings and the cooling passage in the cooling tube to cool the turbine casing, while flakes of carbon and other suspended particles of foreign matter are unable to make the abrupt right angle turn to enter the inlet opening and are swept past the cooling tube.

The features of this invention which are believed to be novel are set forth with particularity in the appended claims. The invention, however, both as the structure and mode of operation, together with further objects and advantages, may better be understood by reference to the following description taken in connection with the accompanying drawings, in which:

FIG. 1 is a partial schematic view of a gas turbine engine, the view showing the cooling tube of this invention in its relation to the other parts of the engine; and FIG. 2 is an enlarged detailed view of the cooling tube and its associated engine structure as shown in FIG. 1; and FIG. 3 is a detailed view, partly in section, of the portion of the cooling tube which extends in the vicinity of the combustion liner.

Referring first to FIG. 1, a portion of a gas turbine engine comprised of a compressor 1, a combustion section 2, and a turbine 3 is shown. Air is compressed by the compressor 1, of which the last compression stage comprised of rotor blades 4 and stator vanes 5 is shown. From the compressor 1 the air is directed through diffuser struts 6 to the combustion section 2. As shown, the combustion section 2 is comprised of an outer casing 7, an inner casing 8, and a perforated combustion liner 9 disposed between the casings 7 and 8. While the combustion liner 9 shown is of the circumferentially extending or annular type, it will be understood that a plurality of cylindrical or canular liners may alternatively be used.

A splitter 12 may be provided at the forward end of the annular combustion liner 9 to split the compressor discharge air into outer and inner flow streams, which are directed into the spaces 13 and 14 located between the combustion liner 9 and the outer casing 7 and the inner casing 8, respectively. Openings 15 are provided in the walls of the combustion liner 9 to allow compressed air from the spaces 13 and 14 to enter the interior of the liner to support combustion therein, the fuel burned within the liner 9 being provided by fuel supply means including the fuel nozzle 16. As a result of the combustion within the liner 9, high temperature products of combustion are produced. It is generally desirable to maintain the temperature of the products of combustion at the highest possible temperature at the turbine inlet which is, of course, usually determined by the characteristics of the metal used in the construction of the turbine 3.

The turbine 3 includes a turbine casing 20 which is secured to the casing 7 by suitable means at 21. The turbine casing 20 is provided with inwardly extending flanges 22 and 23 for supporting shrouds 24 and 25, respectively, and a nozzle diaphragm 26 is provided at the discharge end of the combustion liner 9 for directing the high temperature products of combustion to the first and second stages of turbine buckets 27 and 28. As shown, the flanges 22 and 23 support the shrouds 24 and 25 in close relationship to the tips of the turbine buckets 27 and 28. During turbine operation, the turbine flanges 22 and 23 and, more particularly, the shrouds 24 and 25 may be deleteriously affected for the reasons previously discussed if the temperature of the metal is allowed to become excessive. To protect the turbine parts against excessive temperatures and yet allow the products of combustion to be heated to a higher temperature than would otherwise be possible, cooling means may be provided for cooling the metal parts of the turbine.

Cooling of the high temperature portions of the turbine may conveniently be provided by internal cooling tubes 31 extending into the space 13 at the downstream end of the combustion liner 9. While only one cooling tube is shown by the drawing, it will be understood that in practice a plurality of cooling tubes will preferably be provided around the periphery of the turbine casing 20. Also, it will be understood that similar tubes may extend into the space 14 to provide cooling of other high temperature portions of the turbine.

During engine operation, incomplete combustion of the fuel within the combustion liner 9 may result in the formation of carbon deposits on the walls of the liner 9. These deposits may then flake off of the walls and contaminate the compressed air in the spaces 13 and 14. There is also a possibility that particles of foreign matter may be ingested by the engine and be carried by the compressed air into the spaces 13 and 14. It will thus be seen that the cooling tubes 31 are positioned in a portion of the engine where the compressed air is likely to be contaminated. It is, therefore, desirable to design the cooling tubes 31 to receive the relatively cool compressed air without, however, ingesting the impurities carried by the air; otherwise, the tubes may become obstructed and thereby fail to provide the necessary cooling.

Referring now to FIGS. 2 and 3 in particular, each cooling tube 31 has an axially extending interior passage 32. The forward end 33 of the tube 31 may be pinched as shown or, alternatively, plugged to prevent entry of air from the front of the tube. A plurality of inlet openings 34 are provided in the wall of the cooling tube, the inlet openings being disposed perpendicularly to the direction of the air flow in the space 13. With the inlet openings 34 at right angles to the direction of air flow, the cooling air itself may enter the interior passage 32 of the cooling tube 31, but the foreign particles carried by the compressed air fail to make the right angle turn necessary to enter the interior passage and are swept on by the inlet openings 34.

If, however, carbon or other impurities should obstruct one of the inlet openings 24, the remaining unobstructed openings will assure an adequate flow of cooling air to the high temperature portions of the turbine 3. The inlet openings 34 preferably have smaller cross-sectional areas than the cross-sectional area of the interior passage 32 so that the passage 32 will not be obstructed if any solid particles happen to pass through the inlet openings 34.

Referring now to FIGS. 1 and 2, it will be seen that the casing flanges 22 and 23 are provided with cooling passages 40 and 41 through which cooling air is supplied to cool the flanges and the shrouds 24 and 25 supported therefrom. To supply the cooling passages 40 and 41 with cooling air from the vicinity of the downstream end of the combustion liner 9, the interior passage 32 of each cooling tube 31 discharges air directly into passage 41 from its open downstream end 35. A port 36 is cut in the wall of the cooling tube 31 through which cooling air is supplied to the cooling passage 40.

Thus, it will be seen that this invention provides means for extracting compressed air from the vicinity of the downstream end of the combustion liner and supplying the extracted air to the hot portions of the turbine for cooling purposes. Furthermore, the cooling means of this invention makes possible the extraction of cooling air from a contaminated area of the engine without obstruction of the cooling means resulting.

Although only one embodiment of this invention has been shown and described, it will be obvious to those skilled in the art that other embodiments and modifications are possible within the scope of the appended claims.

What we claim as new and desire to secure by Letters Patent of the United States is:

1. In a gas turbine engine including a casing and combustion means extending axially of said engine, said combustion means including an axially extending perforated liner spaced radially from said casing to form a space between said liner and said casing, the upstream end of said space being supplied with compressed air and hot combustion products being discharged from the interior of said liner at its downstream end; cooling means comprising a cooling tube projecting into said space adjacent the downstream end of said liner, said tube containing an inlet opening disposed perpendicularly to the direction of flow of compressed air in said space, and a passage within said tube communicating with said inlet opening and with the portions of said casing exposed to said hot combustion products, whereby compressed air is directed through said passage to cool the hot portions of said casing.

2. In a gas turbine engine including a casing and combustion means extending axially of said engine, said combustion means including an axially extending perforated liner spaced radially from said casing to form a space between said liner and said casing, the upstream end of said space being supplied with compressed air and hot combustion products being discharged from the interior of said liner at its downstream end; cooling means comprising a cooling tube projecting axially into said space adjacent the downstream end of said liner, said tube containing a plurality of inlet openings disposed perpendicularly to the direction of flow of compressed air in said space, and an axially extending passage within said tube communicating with said inlet openings and the portions of said casing exposed to said hot combustion products, whereby compressed air is directed through said passage to cool the hot portions of said casing.

3. In a gas turbine engine including a casing and combustion means extending axially of said engine, said combustion means including an axially extending perforated liner spaced radially from said casing to form a space between said liner and said casing, the upstream end of said space being supplied with compressed air and hot combustion products being discharged from the interior of said liner at its downstream end; cooling means comprising a cooling tube projecting axially into said space adjacent the downstream end of said liner, said tube containing a plurality of inlet openings disposed perpendicularly to the direction of flow of compressed air in said space, and an axially extending passage within said tube communicating with said inlet openings and the portions of said casing exposed to said hot combustion products, said passage having a cross sectional area greater than the cross sectional area of any one of said plurality of inlet openings, whereby compressed air is directed through said passage to cool the hot portions of said casing.

References Cited in the file of this patent

UNITED STATES PATENTS

| 2,253,597 | Wyne | Aug. 26, 1941 |
| 3,034,298 | White | May 15, 1962 |

FOREIGN PATENTS

| 754,856 | Great Britain | Aug. 15, 1956 |